United States Patent
Brady et al.

(10) Patent No.: US 10,380,081 B2
(45) Date of Patent: Aug. 13, 2019

(54) PRE-BUILDING CONTAINERS

(71) Applicant: Microsoft Technology Licensing, LLC, Redmond, WA (US)

(72) Inventors: Kyle Thomas Brady, Seattle, WA (US); John C. Gordon, Newcastle, WA (US); Benjamin M. Schultz, Bellevue, WA (US); Ali Hajy, Seattle, WA (US); Morakinyo Korede Olugbade, Seattle, WA (US); Hari R. Pulapaka, Redmond, WA (US); Paul McAlpin Bozzay, Redmond, WA (US); Frederick Justus Smith, Redmond, WA (US); Mehmet Iyigun, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/476,641

(22) Filed: Mar. 31, 2017

(65) Prior Publication Data
US 2018/0285171 A1    Oct. 4, 2018

(51) Int. Cl.
*G06F 9/54*     (2006.01)
*G06F 16/21*    (2019.01)
*G06Q 10/10*    (2012.01)

(52) U.S. Cl.
CPC ......... *G06F 16/21* (2019.01); *G06Q 10/1095* (2013.01)

(58) Field of Classification Search
CPC ...................................... G06F 9/542
USPC ....................................................... 719/318
See application file for complete search history.

(56) References Cited

U.S. PATENT DOCUMENTS

| | | |
|---|---|---|
| 6,629,129 B1 | 9/2003 | Bookspan et al. |
| 7,124,164 B1 | 10/2006 | Chemtob |
| 7,492,472 B2 | 2/2009 | Penke et al. |
| 90,181,659 | 7/2009 | Stalnacke et al. |
| 7,679,518 B1 | 3/2010 | Pabla et al. |
| 7,698,400 B1 | 4/2010 | Beloussov et al. |

(Continued)

FOREIGN PATENT DOCUMENTS

| | | |
|---|---|---|
| EP | 1435584 | 7/2004 |
| WO | WO-2000043898 | 7/2000 |

(Continued)

OTHER PUBLICATIONS

"Sharing content during a meeting", Retrieved on: Sep. 14, 2016—Available at: https://helpx.adobe.com/adobe-connect/using/sharing-content-meeting.html, 32 pages.

(Continued)

*Primary Examiner* — Andy Ho (57) ABSTRACT

A container for one or more scheduled meeting is pre-built for the meeting prior to the meeting occurring. The container can be built in a variety of manners, including using both static and dynamic techniques. Dynamic techniques for building a container allows a pre-build system to include more pertinent data in the container whereas static techniques reduce computing workload and allow for pre-building containers for unscheduled meetings. A combination of static and dynamic building techniques can be applied using a layer repository. Alternately, a static base layer can be used and customized for scheduled meetings.

20 Claims, 6 Drawing Sheets

(56) References Cited

U.S. PATENT DOCUMENTS

| | | | |
|---|---|---|---|
| 7,975,073 B2* | 7/2011 | Gonen | H04L 12/1827 370/252 |
| 8,402,091 B2 | 3/2013 | Kamiely | |
| 8,429,540 B1 | 4/2013 | Yankovich et al. | |
| 8,490,157 B2 | 7/2013 | Thompson et al. | |
| 8,904,295 B2 | 12/2014 | Whalin et al. | |
| 8,914,006 B2 | 12/2014 | Bennett | |
| 9,032,028 B2 | 5/2015 | Davidson et al. | |
| 9,071,606 B2* | 6/2015 | Braun | H04L 63/10 |
| 9,071,658 B2* | 6/2015 | McConnell | G06Q 10/10 |
| 9,143,530 B2 | 9/2015 | Qureshi et al. | |
| 9,197,644 B1 | 11/2015 | Sherman et al. | |
| 9,215,272 B2 | 12/2015 | Nelson et al. | |
| 9,344,396 B2 | 5/2016 | Geppert et al. | |
| 9,398,059 B2 | 7/2016 | Shepherd et al. | |
| 9,430,140 B2 | 8/2016 | Reuschel et al. | |
| 10,007,509 B1 | 6/2018 | Qureshi et al. | |
| 2003/0212987 A1 | 11/2003 | Demuth et al. | |
| 2006/0073891 A1 | 4/2006 | Holt | |
| 2008/0137688 A1 | 6/2008 | Walsh | |
| 2009/0094561 A1 | 4/2009 | Do et al. | |
| 2010/0017385 A1 | 1/2010 | Wilcox et al. | |
| 2010/0079676 A1 | 4/2010 | Kritt et al. | |
| 2010/0205540 A1 | 8/2010 | Gupta et al. | |
| 2010/0306018 A1 | 12/2010 | Burtner et al. | |
| 2011/0197132 A1 | 8/2011 | Escoda et al. | |
| 2011/0314561 A1 | 12/2011 | Brill et al. | |
| 2011/0321143 A1 | 12/2011 | Angaluri et al. | |
| 2012/0005588 A1 | 1/2012 | Bastide et al. | |
| 2012/0110087 A1 | 5/2012 | Culver et al. | |
| 2012/0304168 A1 | 11/2012 | Raj seeniraj et al. | |
| 2013/0007465 A1 | 1/2013 | Movassaghi | |
| 2013/0036370 A1 | 2/2013 | Ananthakrishnan | |
| 2014/0214956 A1 | 7/2014 | Huo et al. | |
| 2014/0317261 A1 | 10/2014 | Shatzkamer et al. | |
| 2014/0317293 A1 | 10/2014 | Shatzkamer | |
| 2015/0081764 A1 | 3/2015 | Zhao et al. | |
| 2015/0082345 A1 | 3/2015 | Archer et al. | |
| 2015/0248459 A1 | 9/2015 | Miller et al. | |
| 2016/0080510 A1 | 3/2016 | Dawoud et al. | |
| 2016/0098753 A1 | 4/2016 | Login et al. | |
| 2016/0142541 A1 | 5/2016 | Sharpe et al. | |
| 2016/0210316 A1 | 7/2016 | Bendel et al. | |
| 2016/0212012 A1 | 7/2016 | Young et al. | |
| 2016/0261684 A1 | 9/2016 | Khalaf et al. | |
| 2016/0330201 A1 | 11/2016 | Nguyen-Huu | |
| 2017/0214550 A1 | 7/2017 | Kumar et al. | |
| 2017/0270449 A1* | 9/2017 | Shrimali | G06Q 10/06315 |
| 2018/0114304 A1 | 4/2018 | Brady | |
| 2018/0314821 A1 | 11/2018 | Brady et al. | |
| 2018/0357440 A1 | 12/2018 | Brady et al. | |

FOREIGN PATENT DOCUMENTS

| | | |
|---|---|---|
| WO | WO-2011098749 | 8/2011 |
| WO | WO-2015171030 | 11/2015 |
| WO | 2017035260 A1 | 3/2017 |

OTHER PUBLICATIONS

"GlobalMeet Secure Meetings", Available at: https://www1.maine.gov/oit/services/ServiceDescriptions/GM_SecureMeetings.pdf, Dec. 2010, 8 pages.

"Microsoft: Deploying Skype Room Systems and Surface Hub devices in meeting rooms", http://www.dabcc.com/microsoft-deploying-skype-room-systems-and-surface-hub-devices-in-meeting-rooms/, Oct. 17, 2016, 14 pages.

"Thin Client Diaries: Meeting Virtualized Skype for Business Needs", https://www.citrix.com/blogs/2016/09/30/thin-client-diaries-meeting-virtualized-skype-for-business-needs/, Retrieved on: Nov. 11, 2016, 9 pages.

Longbottom,"Ensure virtualization containers' security in an app world", http://searchitoperations.techtarget.com/tip/Ensure-virtualization-containers-security-in-an-app-world, Apr. 26, 2016, 8 pages.

Rocker,"SPIROS—A system for privacy-enhanced information representation in smart home environments", In Proceedings of the Second International Conference on Intelligent Environments, Jul. 5, 2006, 8 pages.

Scott,"Cross-device transfer in a collaborative multi-surface environment without user identification", In Proceedings of International Conference on Collaboration Technologies and Systems, May 19, 2014, pp. 219-226.

Sheng,"Introducing RancherVM: Package and Run Virtual Machines as Docker Containers", http://rancher.com/introducing-ranchervm-package-and-run-virtual-machines-as-docker-containers/, Apr. 16, 2015, 9 pages.

"Non Final Office Action Issued in U.S. Appl. No. 15/299,107", dated Apr. 6, 2018, 19 Pages.

"International Search Report & Written Opinion Issued in PCT Application No. PCT/US2018/026411", dated Jul. 9, 2018, 12 Pages.

"Non Final Office Action Issued in U.S. Appl. No. 15/498,234", dated Jan. 15, 2019, 11 Pages.

"Final Office Action Issued in U.S. Appl. No. 15/498,234", dated Apr. 15, 2019, 16 Pages.

* cited by examiner

Fig. 6

PRE-BUILDING CONTAINERS

BACKGROUND

As computing devices become increasingly ubiquitous in everyday life, the use of public devices for sharing content is becoming increasingly prevalent. Different people may use these public devices throughout the day for a variety of tasks, including accessing or communicating information. While the availability of public devices is useful, it is not without its problems. One such problem is that access to a user's documents or programs can be slow, resulting in user frustration with these devices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, an indication of a meeting to occur at a future time associated is received. A container for the meeting is created, the container comprising an isolated usage session and containing one or more program or document. The container is added to a container store and provided to a host system responsive to receiving an indication to begin the meeting.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Pre-building containers is discussed herein. Pre-building containers allows users to quickly have access to a secure and individual experience on a computing device without needing to wait for a container to build at the start of a meeting by creating an isolated usage session provisioned with data for the meeting. This reduces delays when starting meetings as information pertinent to the meeting is already in the container upon start up. By pre-building containers, the delay between a user first interacting with a computing device and the user having access to a usage session that includes relevant data to their desired use can be significantly reduced, increasing device usability.

In one or more embodiments, containers are created in a static manner, which refers to the multiple containers being the same (e.g., having the same components, layers, etc.). A pre-build system may receive an indication of how many meetings will occur in day and build a container for each meeting. The pre-build system may keep a store of pre-built meeting containers and build additional containers when the stock is depleted beyond a threshold level (e.g., less than 5 containers remaining), allowing an unscheduled meeting to take advantage of a pre-built container.

Additionally or alternatively, containers are created dynamically for individual meetings. Creating containers in a dynamic manner refers to the multiple containers being different (e.g., having different components, layers, etc.) and customized to each individual meeting. The pre-build system can receive a meeting notification, for instance from a calendaring system (such as in the form of a meeting invite), from a digital assistant, directly from users, or in any other desired manner. The pre-build system can then provision applications, application data, user settings, and so forth based on data associated with the meeting notification. The pre-built container is then added to a container store. Dynamically pre-building containers allows users to begin a meeting without having to load applications or documents, or change settings.

In some embodiments, the pre-built container can be updated with new attachments, metadata, applications, and so forth as it sits in the container store. An update to the meeting can be received after the pre-built container has been added to the container store, and the container pre-build system can update the container within the store to reflect the update. For example, if new relevant information for a container is discovered by the container build system, that relevant information can be added to (or used to update) the container. By way of another example, if a calendar invite for the meeting with additional participants and/or attachments is received, the container for the meeting can be updated to reflect those additional participants and/or attachments.

The containers can be built in any suitable way. For example, the pre-build system may implement layers to create each container. The layers can relate to an enterprise, can relate to specific users or groups of users, can relate to specific host systems associated with the meeting, can vary from meeting to meeting depending on metadata associated with the meeting, and so forth. Each layer may container any combination of data such as applications, documents, display settings, or themes. Additionally or alternatively, meetings can be individually built without the use of layers, or could be cloned so that each container is a duplicate of a standard container.

It should be noted that the techniques are discussed herein with reference to meetings, but can apply analogously to any of a variety of other types of usage sessions. For instance, meetings can take the form of usage sessions and be used in restaurants to display menus, in sporting arenas to display ads, scores, and so on, can be used by an individual user, or in other settings which may not be commonly referred to as a "meeting". As such, it is to be understood that the following discussion is applicable to any use that would benefit from a pre-built container.

Figure 1:
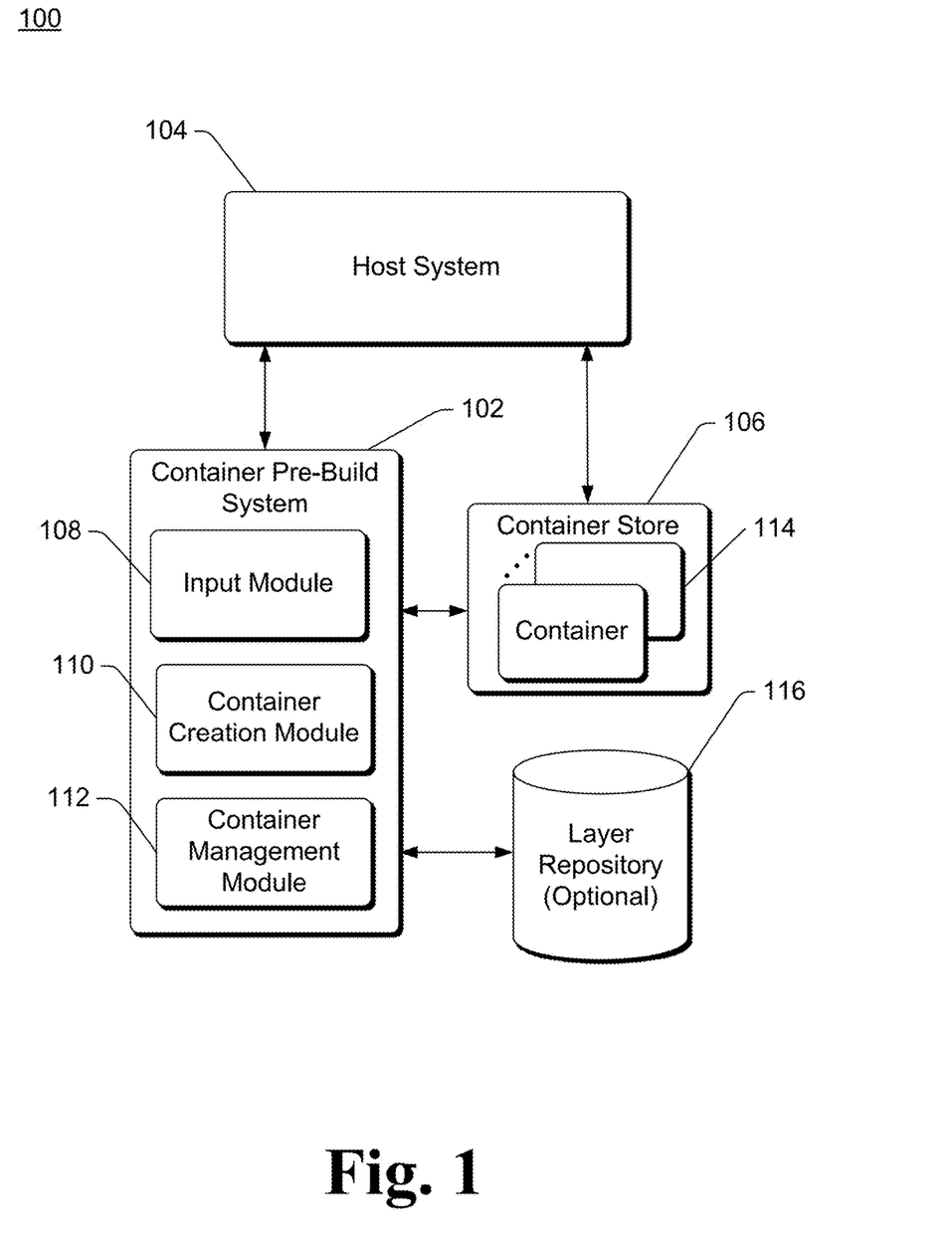
FIG. 1 is a block diagram illustrating an example system for implementing pre-building containers in accordance with one or more embodiments.

FIG. 1 illustrates an example system 100 implementing pre-building of containers in accordance with one or more embodiments. System 100 is implemented at least in part by one or more computing devices. Any of a variety of different types of computing devices can be used to implement the system 100, such as a server computer, a desktop computer, a laptop or netbook computer, a virtual meeting hosting device, a mobile device (e.g., a tablet or phablet device, a cellular or other wireless phone (e.g., a smartphone), a notepad computer, a mobile station), a wearable device (e.g., eyeglasses, head-mounted display, watch, bracelet, virtual reality (VR) glasses or headset, augmented reality (AR) headset or glasses), an entertainment device (e.g., an entertainment appliance, a set-top box communicatively coupled to a display device, a game console), Internet of Things (IoT) devices (e.g., objects or things with software, firmware, and/or hardware to allow communication with other devices), a television or other display device, an automotive computer, and so forth. Thus, the computing device implementing system 100 may range from a full resource device with substantial memory and processor resources (e.g., personal computers, game consoles) to a low-resource device with limited memory and/or processing resources (e.g., traditional set-top boxes, hand-held game consoles).

The system 100 includes a container pre-build system 102 and a host system 104. In one or more embodiments, the container pre-build system 102 and the host system 104 are implemented as part of the same computing device. Alternatively, at least part of the container pre-build system 102 can be implemented on a separate device from the device implementing the host system 104. In a network implementation comprising multiple host systems 104, each host system 104 can have an individual container pre-build system 102, or the multiple host systems 104 can share one or more container pre-build systems 102.

Additionally, a container store 106 for storing the containers 114 after they have been created by the container pre-build system 102 can be implemented on the same or a different device from that on which the container pre-build system 102 and host system 104 are implemented. For instance, the container store 106 can be implemented as part of the container pre-build system 102, as part of the host system 104, or as part of a cloud accessible by multiple container pre-build systems 102 and multiple host systems 104. The container store 106 can optionally be multiple container stores 106. For example, if the container pre-build system 102 is implemented in a network that comprises multiple host systems 104, a container store 106 for each host system 104 could be implemented such that the host system 104 only has access to the container store 106 associated with the host system 104. Alternatively, the container store 106 could be implemented via a cloud as a service accessible to all host systems 104 connected to the network.

Each container is an isolated usage session provisioned with various data for a meeting. Multiple containers can be run at the host system 104 concurrently, with each container including one or more components. These components include, for example, virtual devices (e.g., one or more processors, memory, storage devices), a base operating system (e.g., an operating system kernel), a user-mode environment, applications, and so forth. A base operating system component provides various different low level system services to components in the container, such as session management, program execution, input/output services, resource allocation, and so forth. The base operating system component can be a full operating system, or alternatively only a portion of a full operating system (e.g., the base operating system component may be a very small component if the container shares most of the operating system with the host (in particular, the kernel)). The user-mode environment component provides a runtime environment for applications in the container (e.g., a Java Runtime Environment, a .NET framework, and so forth). The application component is an application that is desired (e.g., by a user, administrator, other program, etc.) to be run in the container (e.g., a web service, a calculation engine, etc.).

One type of container that a container 114 can be implemented as is referred to as a process container. For a process container, the application processes within the container run as if they were operating on their own individual system (e.g., computing device), which is accomplished using namespace isolation. The host system 104 implements namespace isolation. Namespace isolation provides processes in a container a composed view consisting of the shared parts of the host operating system and the isolated parts of the operating system that are specific to each container such as file system, configuration, network, and so forth.

Another type of container that a container 114 can be implemented as is referred to as a virtualized container. For a virtualized container, the virtualized container is run in a lightweight virtual machine that, rather than having specific host physical memory 104 assigned to the virtual machine, has virtual address backed memory pages. Thus, the memory pages assigned to the virtual machine can be swapped out to a page file. The use of a lightweight virtual machine provides additional security and isolation between processes running in a container. Thus, whereas process containers use process isolation or silo-based process isolation to achieve their containment, virtualized containers use virtual machine based protection to achieve a higher level of isolation beyond what a normal process boundary can provide. A container may also be run in a virtual machine using physical memory of the host system 104, and cloning can be used to copy the state of the template container into the physical memory used by the new container. Such a container using physical memory allows for higher isolation, e.g., in situations where the use of virtual memory for the virtual machine is not desired because of performance or security concerns.

The container pre-build system 102 includes an input module 108. The input module 108 receives inputs from a variety of sources including user inputs provided by a user, and inputs received over a network from other devices. User inputs can be given at the computing device on which the container pre-build system 102 is implemented, or on an external computing device. These inputs can be provided by a user pressing one or more keys of variety of different manners, such as by pressing one or more keys of a keypad or keyboard of the computing device, pressing one or more keys of a controller (e.g., remote control device, mouse, track pad, etc.) of the computing device, pressing a particular portion of a touchpad or touchscreen of the computing device, making a particular gesture on a touchpad or touchscreen of the computing device, and/or making a particular gesture on a controller (e.g., remote control device, mouse, trackpad, etc.) of the computing device. User inputs can also be provided via other physical feedback input to the computing device, such as tapping any portion of the computing device, an action that can be recognized by a motion detection or other component of the computing device (such as shaking the computing device, rotating the computing device, bending or flexing the computing device, etc.), and so forth. User inputs can also be provided in other manners, such as via voice or other audible inputs to a microphone, via motions of hands or other body parts observed by an image capture device, and so forth. User inputs can be provisioned to the input module 108 directly or indirectly.

Additionally, the input module 108 can receive inputs from additional devices over a network. This can include receiving meeting invitations from a calendaring system, receiving notifications of usage sessions from a scheduling system, or receiving an indication of a need for a container at a future time in any other way. Additionally, an update to a meeting can also be received in any of the aforementioned ways. Further, the input module 108 can receive inputs from sensors or cameras at devices on which a host system 104 is running, input from calendaring or equipment availability tracking systems, input from an administrator of the pre-build system, or from other sources of data.

One of the additional devices from which the input module 108 can receive input is the host system 104. The host system 104 may have one or more sensors that determine environmental factors related to a room in which the host system 104 is to be used. These sensors can include a camera which can determine characteristics of the room including the size, color, motifs, and available light. The sensors can further include one or more Global Positioning System (GPS) components, Bluetooth sensors, magnetic orientation sensors, ambient light sensors, gyroscopes, accelerometers, inertial measurement unit (IMU) sensors, and so on. Further, the host system 104 can provide inputs to indicate resources available such as Bluetooth, speakers, disc drives, ports, and other capabilities available for use at the host system 104 such that a container 114 can include appropriate infrastructure to support these capabilities.

Further still, the host system 104 of a host device may provide information relating to the topography of host devices in an environment. For example, if multiple host devices exist in a room, the host devices can know their relative locations such that a set of multi-device containers can be created in order to utilize the multiple host devices. A set of multi-device containers can include a continuous background image that continues from one container to another container creating a cohesive environment while maintaining isolated containers for each of the multiple host systems. Alternately, topological information can be maintained or accessible to the container pre-build system 102 from another source.

The container pre-build system 102 also includes a container creation module 110. The container creation module 110 creates containers 114 for use by the host system 104. The container creation module 110 receives information from the input module 108 and creates the container 114 based on the information. The container can be built to include information received by the input module 108, or data derived from the information received by the input module 108. For example, the container creation module 110 can create containers 114 for meetings ahead of time responsive to a meeting notification where the meeting notification is a meeting invite sent via a scheduling application or email service and is associated with a future time. Such meeting notifications and/or indications of a meeting can take various forms, such as a schedule, direct input, or any other desired method of indicating a desire for a container to be pre-built.

The container creation module 110 includes and/or has access to programs, applications, settings, and/or any other desired characteristics based on information corresponding to the meeting in the container 114. Dynamic, custom pre-built containers allow a user to quickly have access to any files, and the programs used to read those files, upon beginning an interaction with the host system 104. This is accomplished by building the container prior to the start of the meeting to include the appropriate files and programs.

Alternately, or in addition, the container creation module 110 may create static or standard containers for meetings. By creating static containers, the load on the container pre-build system 102 can be reduced by simply cloning a standard container rather than customizing the containers for individual meetings. Additionally, in the case of static containers, a meeting does not have to be scheduled in advance in order for the user to immediately have access to a container when starting a meeting.

It should be noted that some combination of standard pre-built containers and custom pre-built containers might be employed together in order to provide both the benefits of the standard and custom containers. For instance, a functional base layer may comprise a minimal amount of applications and data that will be used across most meetings. The standard base layer can be available for meetings that have not been scheduled in advance. The standard base layer can be implemented across an enterprise, or can vary between host systems 104. While the standard base layer can be a static layer, the base layer can alternatively be dynamically changed based on a learning system. If a meeting is scheduled in advance, additional layers can be added to the base layer to customize the container 114 for the meeting. Layers relating to user preferences, documents associated with the meeting, and so on can be added to the container.

The system 100 also optionally includes a layer repository 116. The use of layers can reduce the computational load for creating a custom built container by eliminating computing redundancy. As discussed above, a base layer can be created for each meeting, then additional (e.g., increasingly smaller) layers can be included in the container. The layer repository 116 can be a static repository or can communicate with the container pre-build system 102 to add newly created layers to the repository. The layer repository 116 can be implemented at any level, for instance, a single layer repository 116 can be accessible across an enterprise or a layer repository 116 can be implemented for each container pre-build system 102 or host system 104. Alternately, the layer repository 116 could be a service accessible to multiple enterprises. As such, keeping data layers that container user specific information private is important. Accordingly, user specific layers can be associated with a credential such that they are only accessible when the user is present, can be stored separately from widely available layers, or can be created on the fly rather than stored.

The container pre-build system 102 further includes a container management module 112. Once the container creation module 110 completes a container 114, the container 114 is passed to the container management module 112. The container management module 112 inserts the container 114 into a container store 106 so that when the meeting related to a particular container begins, the host system 104 can be provided with the particular container from the container store 106 and start the meeting. In the case of custom containers, the container management module 112 can track the container in order to ensure that the host system 104 receives the correct container. The host system 104 can request or pull the appropriate container from the container store 106 based on an identification relating the meeting and the container, or the container creation module 110 can provision the container 114 based on a trigger (e.g., a time or timer associated with the container).

Figure 2:
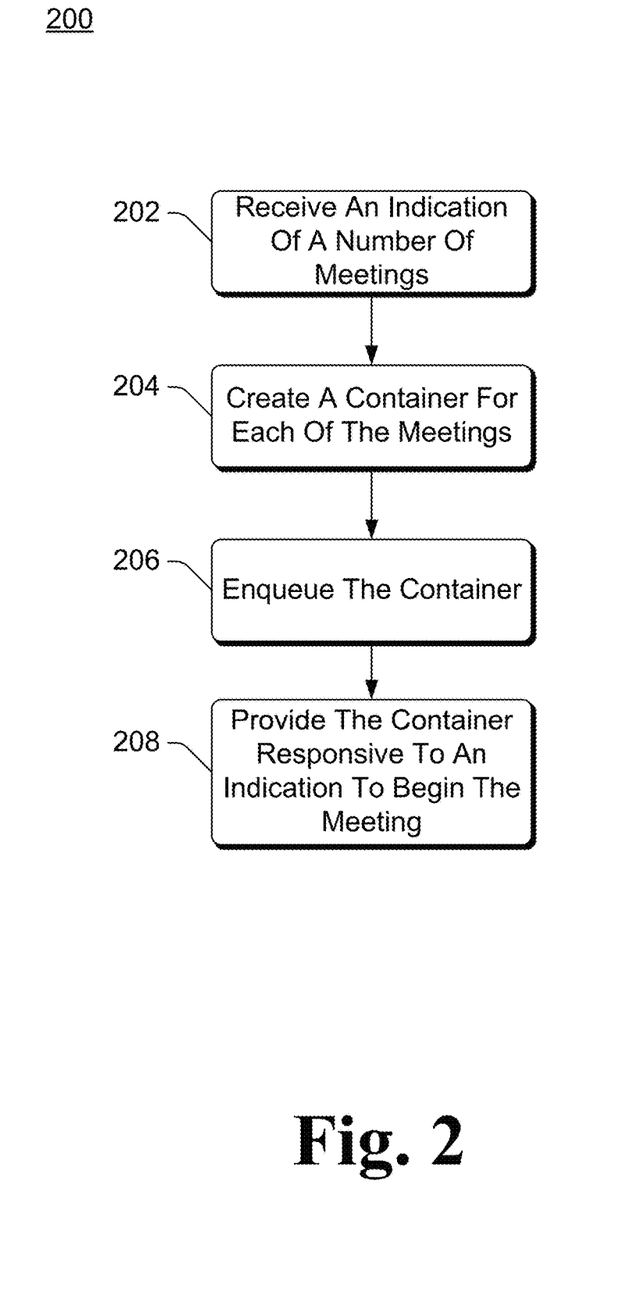
FIG. 2 is a flowchart illustrating an example process for implementing pre-building containers in accordance with one or more embodiments.

FIG. 2 is a flowchart illustrating an example process 200 for pre-building containers in accordance with one or more embodiments. Process 200 is carried out by a system, such as system 100 of FIG. 1, and can be implemented in software, firmware, hardware, or combinations thereof. Process 200 is shown as a set of acts and is not limited to the order shown for performing the operations of the various acts. Process 200 is an example process for pre-building containers; additional discussions of pre-building containers are included herein with reference to different figures.

In process 200, an indication of a number of meetings is received (act 202). This indication can be received from various sources, such as a calendaring system, a digital assistant, and so forth. This indication can be a single indication that lists all scheduled meetings for a day, or simply lists a number of meetings. Alternately, multiple indications of meetings can be received. For instance, when a user creates and sends a meeting invitation in a calendaring system, the meeting invitation can serve as an indication of a meeting.

A container for each meeting is created (act 204). As discussed in further detail with reference to FIG. 3, the containers can be standard containers for each meeting, or can be custom containers built using metadata associated with the indication.

The created container is then placed in the container store 106 (206). The container store 106 can take multiple forms. For instance, the container store 106 could be a queue. If the containers are standard built, the newly created container can simply be added to the beginning or end of the queue. If the container is custom built, it can be placed in the queue at an appropriate place such that when the associated meeting occurs, the container is the next queued container. Alternately, the containers 114 can each be associated with an ID and stored such that an appropriate container can be retrieved and provided for an associated meeting, or modified responsive to an update for the meeting (e.g., modified to include available new information for the meeting).

The container is then provided to the host system 104 responsive to an indication to begin the meeting (act 208). The indication to begin the meeting can be recognized as a trigger by the container management module 112 of the container pre-build system 102. The trigger can comprise a time or timer associated with the container 114 or meeting, or can be received from the host system 104, such as an indication that a user is detected or provides credentials at a device on which the host system 104 operates, or any other desired trigger.

Figure 3:
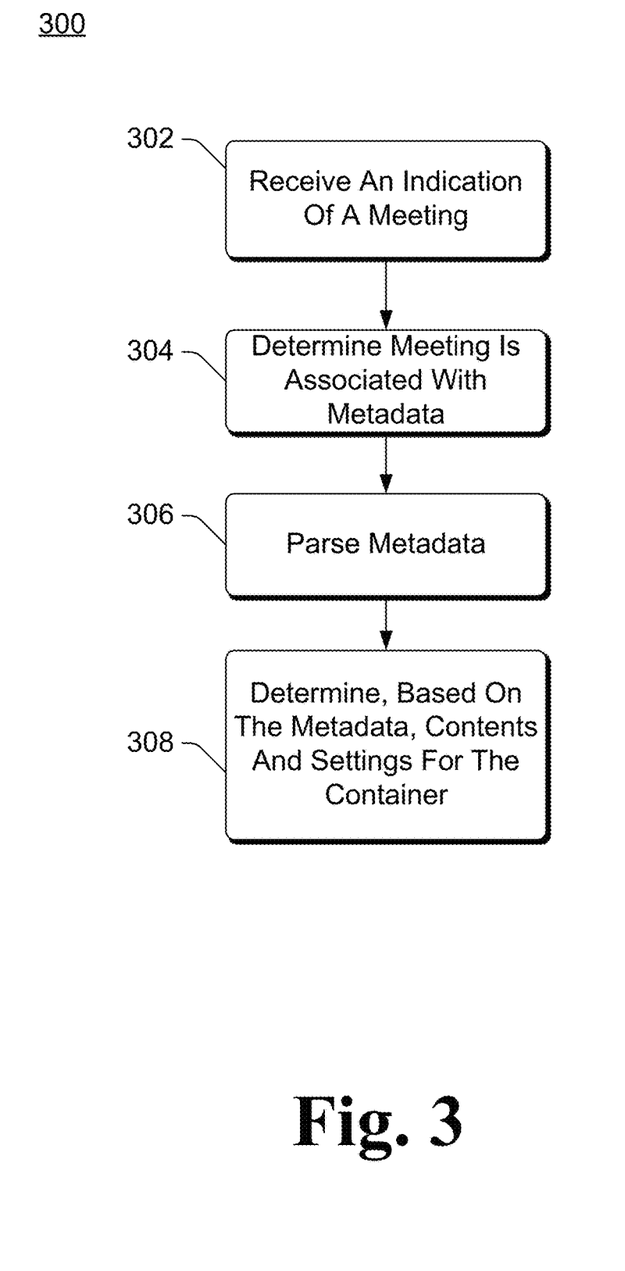
FIG. 3 is a flowchart illustrating another example process for implementing pre-building containers in accordance with one or more embodiments.

FIG. 3 is a flowchart illustrating an example process 300 for pre-building containers in accordance with one or more embodiments. Process 300 is carried out by a system, such as system 100 of FIG. 1, and can be implemented in software, firmware, hardware, or combinations thereof. Process 300 is shown as a set of acts and is not limited to the order shown for performing the operations of the various acts. Process 300 is an example process for pre-building containers; additional discussions of pre-building containers are included herein with reference to different figures.

In process 300, an indication of a meeting is received (act 302). This indication can be received from various different sources as discussed above, such as a calendaring or email system, an input direct to container pre-build system 102, and so forth.

The meeting is determined to be associated with metadata (act 304). This metadata can be information contained within the indication received in act 302, or can be associated in a different way. For example, if the indication is a meeting invite, the meeting invite may have an attachment contained therein. The meeting invite might further include multiple invitees who have user profiles accessible to the container pre-build system 102. Additionally, the meeting invite may indicate a particular host system 104 or meeting room which the container pre-build system 102 has access to data about.

The metadata is then parsed (act 306). This includes parsing information directly associated with the meeting invitation such as an attachment, meeting topic, a number of attendees, etc., as well as information contained in a database such as profiles of users invites to the meeting, data associated with a host system 104 identified in the meeting invitation, and so on.

Based on the parsed metadata, the contents and settings for the container are determined (act 308). For example, the attachment can be determined to be a document, and thus both the attached document and an appropriate application for opening the document can be included in the container. The container pre-build system 102 can also license the desired applications as appropriate, for example by applying the license of one of the meeting members, by applying an enterprise license, or by alerting the meeting host of the lack of a license.

Further, the parsed metadata can include information about user preferences and settings for the meeting participants and apply these to the container. For example, information stored in a user profile can be parsed to determine preference settings for display, commonly used applications and preferred settings within applications, browser favorites, desktop organization, and so on. These preferences and settings can be related to the layout and applications included in the container, can be accessibility settings, display sizes, or any other settings either global to the container or specific to an application. Further, sensors and cameras at the host system 104 where the meeting is to occur can be accessed and metadata parsed to determine environmental factors such as size, color, motif, brightness and so on in the room.

In determining settings to apply to a container, the container pre-build system 102 can combine the settings in different manners, such as using a union, intersect, and/or weighted combination of user settings. For instance, accessibility settings could be applied using a union of all accessibility settings used by any meeting attendee in order to allow all to participate. An accessibility setting, for example, might be a magnifying glass, display size, cursor thickness, or any other setting that enables use of a device. An example of a setting that would be applied as an intersection includes the display language. For instance, if the host system 104 has English as the default language, that would not be changed unless metadata associated with each of the meeting attendees indicated a preference for a same alternate language. A weighted combination of user settings could be used if some attendees are listed as required and others as optional, or if one or more attendees are designated as presenters or meeting leaders, giving more weight to the preferences of the required attendees or presenters.

Additionally, the parsed metadata may indicate a number of invitees, topographical or usage knowledge specific to the host system 104, or any other factor. For instance, if a large number of people are included in the meeting notification, the font and automatic display size can be increased to enable users to view the display from a greater distance without having to manually resize. For example, if the container pre-build system 102 may have learned that the host system 104 is commonly used in a presentation setting, or knows that it is in an auditorium or conference room, the display settings can be set for visibility from a distance whereas if the host system 104 is located in a hallway or team meeting room, the display settings can be determined for viewing by users closer to the host system 104 and the font size can be smaller and the display denser.

The container pre-build system 102 may further customize containers based on metadata associated with the host system 104. The host system 104 may have sensors or cameras that determine environmental factors, or may be associated with metadata that indicates environmental factors such that the host system 104 is in a dim or well-lit area, or characteristics of the room such as size, color, or motif. These sensors can include one or more GPS components, Bluetooth sensors, magnetic orientation sensors, ambient light sensors, gyroscopes, accelerometers, IMUs, and so on. The container pre-build system 102 can determine that it should therefore adjust the brightness of the display, or apply a theme to the container 114 corresponding to the room characteristics such as matching or complementing a color or motif present in the room, or change the font size or display density.

Additionally, the container pre-build system 102 may employ a learning system. The container pre-build system 102 can learn settings specific to a host system 104, specific to a user or group of users, applications, or data types. If users of a particular host system 104 frequently adjust settings in the same way, the container pre-build system 102 can associate these settings with the host system 104. A setting can be frequently adjusted at a threshold percentage of users making the same adjustment. For instance, if 70% of users adjust the font size on a display to be bigger, the default font size for the host system 104 can be increased. It should be noted that other percentages can be used and that threshold percentages can vary between settings. Similarly, if a particular user makes a same change, metadata can be added to the user's profile. Alternately, this learning system could store the learned data at the container pre-build system 102.

Figure 4:
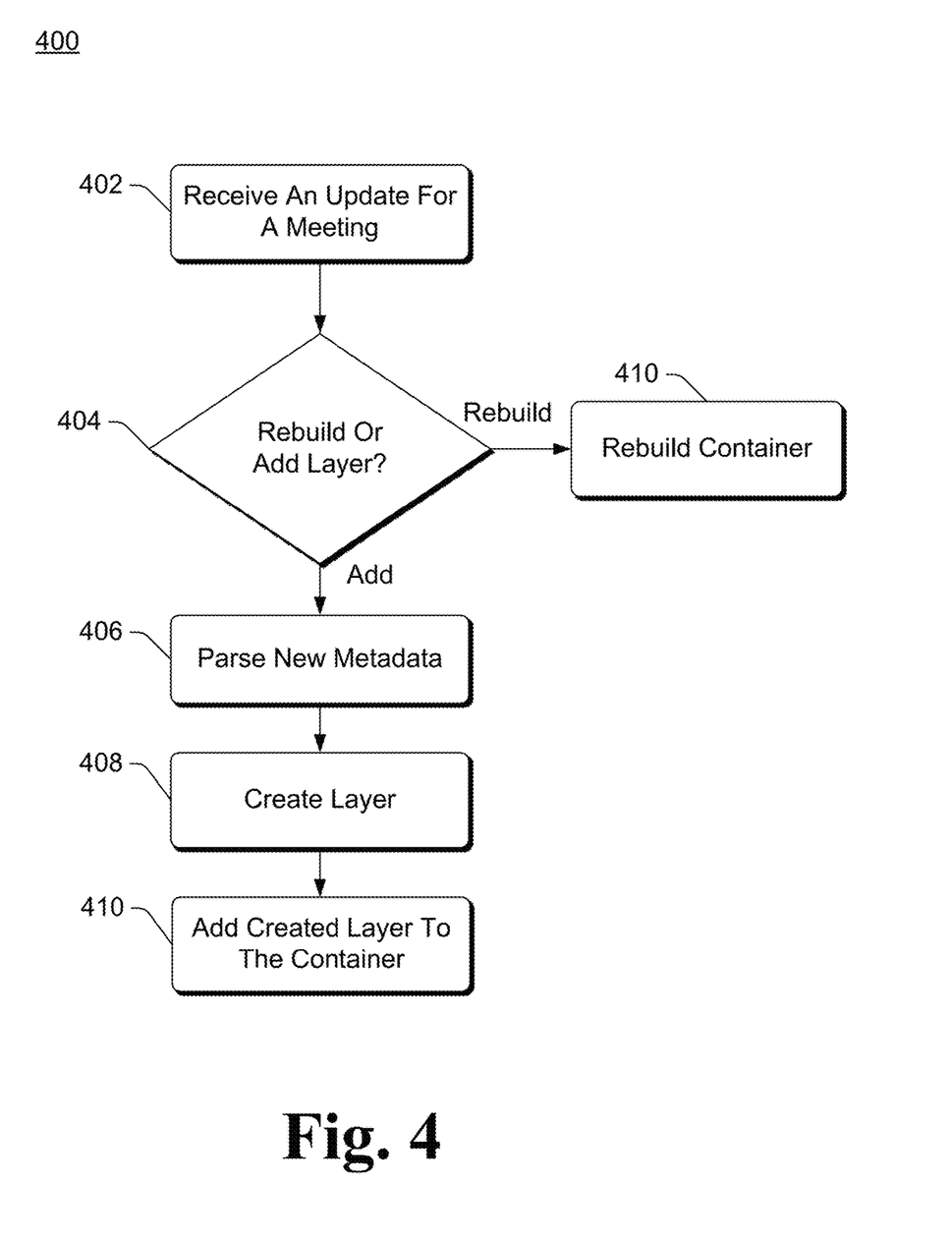
FIG. 4 is a flowchart illustrating another example process for implementing pre-building containers in accordance with one or more embodiments.

FIG. 4 is a flowchart illustrating an example process 400 for pre-building containers in accordance with one or more embodiments. Process 400 is carried out by a system, such as system 100 of FIG. 1, and can be implemented in software, firmware, hardware, or combinations thereof. Process 400 is shown as a set of acts and is not limited to the order shown for performing the operations of the various acts. Process 400 is an example process for pre-building containers; additional discussions of pre-building containers are included herein with reference to different figures.

In process 400, an update to a meeting is received (act 402). This can include a change to invitees or user profiles of an invitee, a change in location, a change in attached documents, a change in time, or any other change associated with the meeting. A change can be received in any desired way, for instance as an updated meeting invitation sent via a calendaring system.

The container pre-build system 102 then determines whether to apply a new layer or to rebuild the container to provide the update (act 404). This decision can be based on various factors, such as how busy the pre-build system is (e.g., how much time there is before the meeting and/or how many other containers the pre-build system is creating), how much data is changed, and so forth. If the container pre-build system 102 is busy and/or the change in data associated with the meeting is small (e.g., less than a threshold amount, such as 10% of the size of the container), it can be determined to add a layer to reduce the computing workload associated with the update. However, if the container pre-build system 102 is not busy, or the change in data associated with the meeting is not small, it can be determined to build a new container.

If it is determined to add a layer in act 404, the new metadata in the update is parsed (act 406). As described above, the parsed metadata can be used to determine applications, data, settings, and so forth to be included in a layer.

The parsed metadata is then used to create a layer (act 408). As described above, this layer can be built specifically based on the determined applications, data, settings, and so on included in the update. Alternately, a layer can be taken from the layer repository 116.

The created layer is then added to the container in the container store 106 (act 410). An update to a container can be made at any time prior to the container being run at the host system 104.

If it is determined to rebuild the container in 404, the original container can be deleted and a new process for pre-building a container can occur based on the updated meeting indication (act 412).

Figure 5:
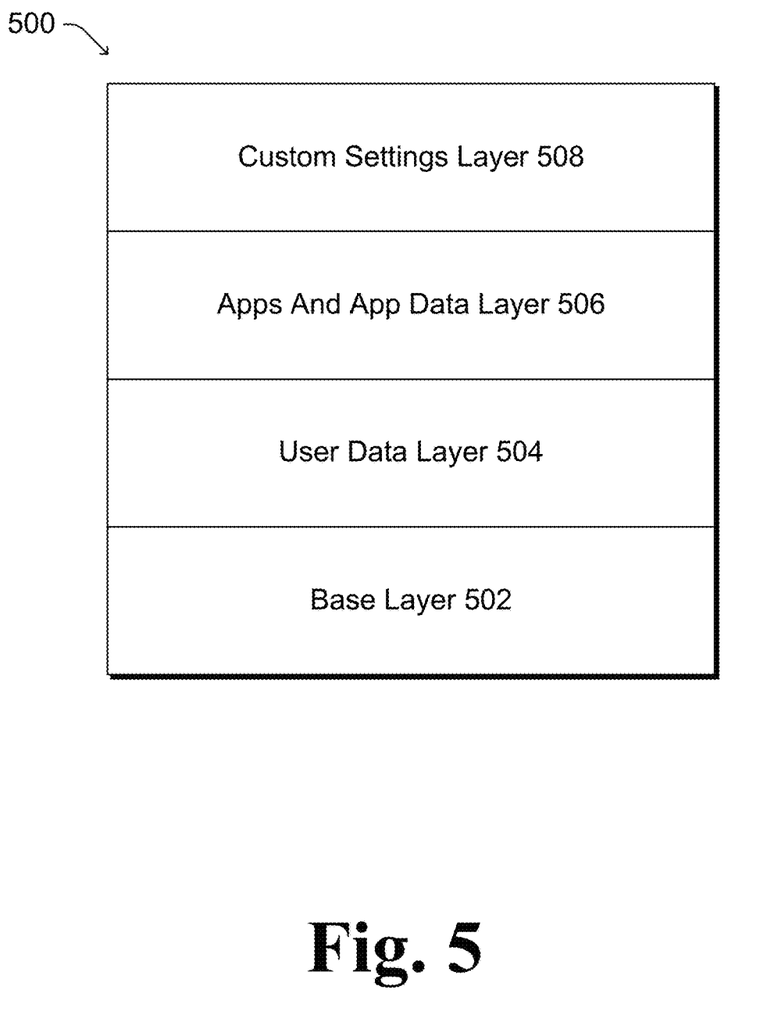
FIG. 5 is a block diagram illustrating an example container for implementing pre-building containers in accordance with one or more embodiments.

FIG. 5 is an example of a pre-built container 500 in accordance with one or more embodiments. The pictured layers are a single example of layers that can be included in a container and could be combined into fewer layers, broken out into additional layers, or different layers can be included. Layers can be stored in a layer repository which can be a part of the container pre-build system 102 or can be implemented separately. Layers can be used in order to reduce computing duplication when building a container.

Layers can be added or removed from a container at any time prior to the container being opened at the start of the meeting. For instance, if a container is created based on an original meeting invitation, and then a follow-up meeting invitation is added changing some of the data associated with the meeting, the layers can be changed to reflect the changes in the meeting invitation.

Layers can be created or selected from a layer repository 116. A base layer can include applications that every meeting uses. The container pre-build system 102 then parses metadata associated with the meeting to determine related applications and user settings. The applications can be determined based on files included in the meeting invite, based on the users or combination of users in the meeting invite. The user settings that are included in the pre-built container can be any combination of user settings from the invitees. For example, any accessibility settings required by any single invitee can be included in the container. The user settings can apply globally to the container or be specific to applications loaded in the container.

A base layer 502 can be a static component for dynamically generated containers. The base layer 502 can be set for an enterprise, a host system 104, a user group such as a subsection of users within an enterprise. The base layer 502 can include applications, documents, and settings applied across all containers. Additionally, multiple base layers 502 can be applied. For instance, an enterprise can have a designated base layer than includes specific applications, such as security applications. Within the enterprise, there may be multiple host systems 104 that also have an associated base layer 502 which can include certain applications frequently used at the host system 104, display themes or settings, and so on. Host specific layers can also be added as a custom settings layer 508. Alternately, the base layer 502 can be a dynamic component. For instance, the base layer 502 can be changed based on time of day, time of year, data associated with a meeting, or any factor as discussed above.

A user data layer 504 can optionally be multiple layers for each user or a single layer that combines user data for the meeting. As described above, user data 504 can be applications, application settings, accessibility settings, and so on. User data can be included in the container as a union, intersect or weighted combination and can be included in one or more user data layers 504 as discussed above. A user data layer 504 can be stored in the layer repository 116, stored as part of a user profile, or created specifically for a container 114.

The applications and application data 506 includes any applications, documents, licenses, and so on for the container. This can include any application needed for an attachment associated with the meeting invitation. Further, the application data can be associated with a user and require a user to be present and provide credentials in order to be accessed. For instance, if a file is associated with the meeting, but is also associated with one or more users, the one or more users can a password or other form of authentication in order for the file to be accessed.

Custom settings layer 508 can be applied by the container pre-build system 102 or by the host system 104 and can include a theme, background image, display settings, and so on. The host system 104 can implement a learning system and store and add a custom layer 508 upon receiving the container 114. Further, the custom settings layer 508 can be built and updated based on data from one or more sensors of the host system 104 such as GPS components, Bluetooth sensors, magnetic orientation sensors, ambient light sensors, gyroscopes, accelerometers, IMUs, and so on.

Although particular functionality is discussed herein with reference to particular modules, it should be noted that the functionality of individual modules discussed herein can be separated into multiple modules, and/or at least some functionality of multiple modules can be combined into a single module. Additionally, a particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 6:
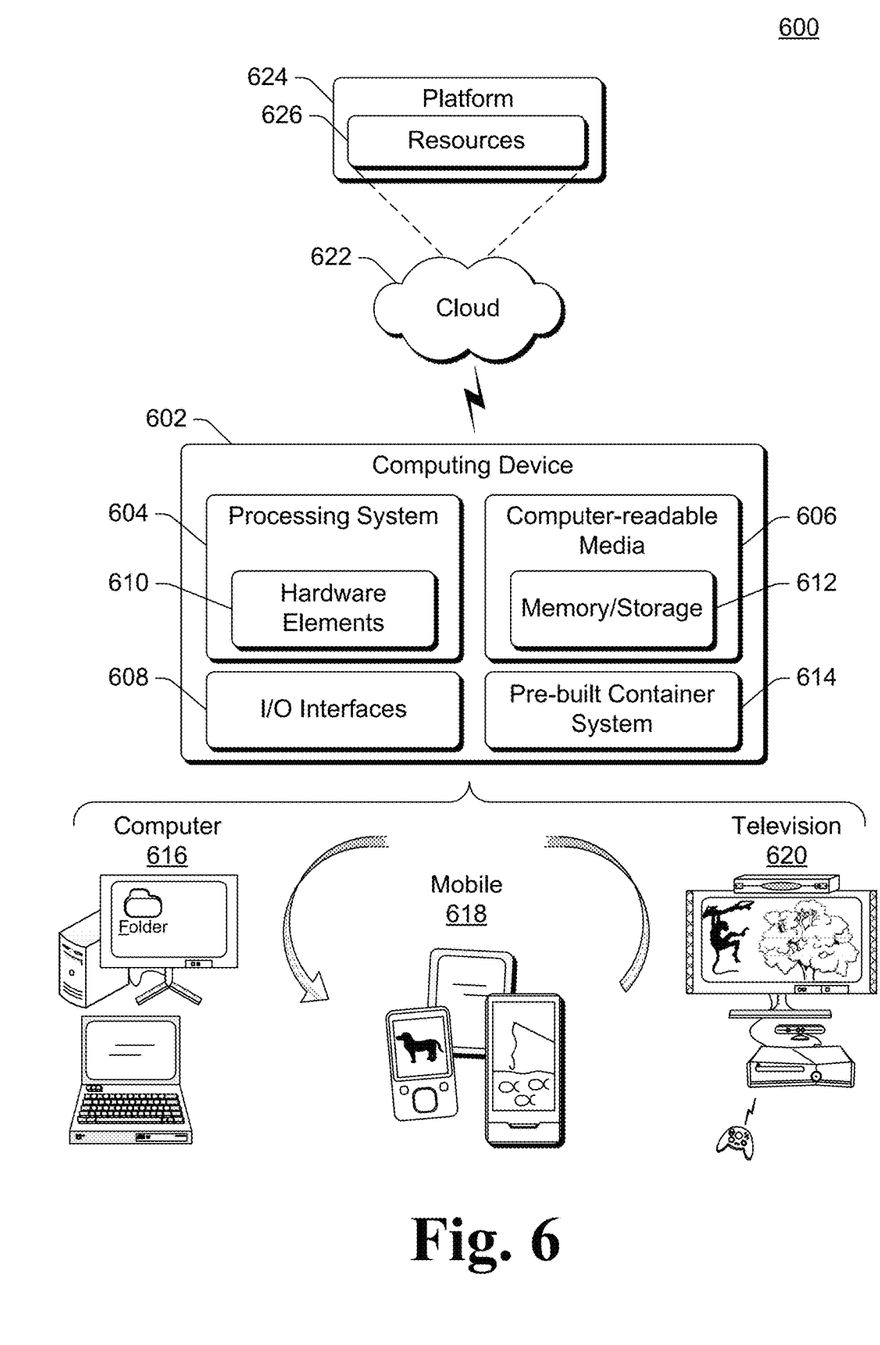
FIG. 6 illustrates an example system that includes an example computing device that is representative of one or more systems and/or devices that may implement the various techniques described herein.

FIG. 6 illustrates an example system generally at 600 that includes an example computing device 602 that is representative of one or more systems and/or devices that may implement the various techniques described herein. The computing device 602 may be, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O Interfaces 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware elements 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 606 is illustrated as including memory/storage 612. The memory/storage 612 represents memory/storage capacity associated with one or more computer-readable media. The memory/storage 612 may include volatile media (such as random access memory (RAM)) and/or nonvolatile media (such as read only memory (ROM), Flash memory, optical disks, magnetic disks, and so forth). The memory/storage 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

The one or more input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone (e.g., for voice inputs), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 602 may be configured in a variety of ways as further described below to support user interaction.

The computing device 602 also includes a pre-built container system 614. The pre-built container system 614 provides various functionality supporting pre-building containers as discussed herein. The pre-built container system 614 can implement, for example, the host system 104, container pre-build system 102, container store 106, and/or layer repository 116 of FIG. 1.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" refers to media and/or devices that enable persistent storage of information and/or storage that is tangible, in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, the hardware elements 610 and computer-readable media 606 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of modules as a module that is executable by the computing device 602 as software may be achieved at least partially in hardware, e.g., through use of computer-readable storage media and/or hardware elements 610 of the processing system. The instructions and/or functions may be executable/operable by one or more articles of manufacture (for example, one or more computing devices 602 and/or processing systems 604) to implement techniques, modules, and examples described herein.

As further illustrated in FIG. 6, the example system 600 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 600, multiple devices are interconnected through a central computing device. The central computing device may be local to the multiple devices or may be located remotely from the multiple devices. In one or more embodiments, the central computing device may be a cloud of one or more server computers that are connected to the multiple devices through a network, the Internet, or other data communication link.

In one or more embodiments, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one or more embodiments, a class of target devices is created and experiences are tailored to the generic class of devices. A class of devices may be defined by physical features, types of usage, or other common characteristics of the devices.

In various implementations, the computing device 602 may assume a variety of different configurations, such as for computer 616, mobile 618, and television 620 uses. Each of these configurations includes devices that may have generally different constructs and capabilities, and thus the computing device 602 may be configured according to one or more of the different device classes. For instance, the computing device 602 may be implemented as the computer 616 class of a device that includes a personal computer, desktop computer, a multi-screen computer, laptop computer, netbook, and so on.

The computing device 602 may also be implemented as the mobile 618 class of device that includes mobile devices, such as a mobile phone, portable music player, portable gaming device, a tablet computer, a multi-screen computer, and so on. The computing device 602 may also be implemented as the television 620 class of device that includes devices having or connected to generally larger screens in casual viewing environments. These devices include televisions, set-top boxes, gaming consoles, and so on.

The techniques described herein may be supported by these various configurations of the computing device 602 and are not limited to the specific examples of the techniques described herein. This functionality may also be implemented all or in part through use of a distributed system, such as over a "cloud" 622 via a platform 624 as described below.

The cloud 622 includes and/or is representative of a platform 624 for resources 626. The platform 624 abstracts underlying functionality of hardware (e.g., servers) and software resources of the cloud 622. The resources 626 may include applications and/or data that can be utilized while computer processing is executed on servers that are remote from the computing device 602. Resources 626 can also include services provided over the Internet and/or through a subscriber network, such as a cellular or Wi-Fi network.

The platform 624 may abstract resources and functions to connect the computing device 602 with other computing devices. The platform 624 may also serve to abstract scaling of resources to provide a corresponding level of scale to encountered demand for the resources 626 that are implemented via the platform 624. Accordingly, in an interconnected device embodiment, implementation of functionality described herein may be distributed throughout the system 600. For example, the functionality may be implemented in part on the computing device 602 as well as via the platform 624 that abstracts the functionality of the cloud 622.

In the discussions herein, various different embodiments are described. It is to be appreciated and understood that each embodiment described herein can be used on its own or in connection with one or more other embodiments described herein. Further aspects of the techniques discussed herein relate to one or more of the following embodiments.

A method comprising: receiving an indication of a meeting and an indication of a future time associated with the meeting; creating a container for the meeting, the container comprising an isolated usage session and containing one or more program or document; adding the container to a container store; and providing the container to a host system, responsive to receiving an indication to begin the meeting.

Alternatively or in addition to any of the above described methods, any one or combination of the method further comprising determining the indication of the meeting is associated with metadata, parsing the metadata, and customizing the container based on the metadata; the method further comprising customizing the container based on metadata associated with one or more people associated with the meeting, the customization comprising injecting one or more applications, applying display settings, or activating accessibility settings; the method further comprising customizing the container based on documents associated with the meeting, the customization comprising including the document in the container, including an application associated with the document, or attaining a license for an application associated with the document; the method further comprising customizing the container based on a host system associated with the meeting, the customization comprising applying a theme determined by the host system, applying display settings, or including an application; wherein the indication of the meeting comprising a meeting invitation sent via a calendaring program; the method further comprising receiving an indication of a change associated with the meeting; and updating the container in the container store based on the indication of the change; the method further comprising receiving an indication of at least one additional meeting, building an additional container for the at least one additional meeting, and adding the additional container to the container store.

One or more computer-readable storage media having stored thereon multiple instructions that, when executed by one or more processors of a computing device, cause the one or more processors to: receive an indication of a number of usage session scheduled, and a future time associated with each of the number of usage sessions; build a container for each of the number of usage sessions, the container comprising an isolated computing space containing data relevant to the usage session; add each of the containers to a container store; retrieve the container for a specific meeting; and provide the container for the specific meeting to a host system.

Alternatively or in addition to any of the above described computer-readable storage media, any one or combination of: wherein the containers built for each of the number of usage sessions are the same; wherein the containers built for each of the number of usage sessions is custom built for a specific usage session; wherein the custom built container is customized based on user data including accessibility settings, frequently used applications, or one or more learned preferences; wherein the custom built container is customized based on characteristics of the host system, including characteristics determined by one or more sensors of the host system, a location of the host system in relation to one or more additional host systems, or one or more frequent settings; wherein the custom built container is customized based on data associated with the specific usage sessions, the data including one or more documents associated with the usage session or one or more user profiles associated with the usage session.

A computing device comprising: one or more processors; and computer-readable storage medium having stored thereon multiple instructions that, responsive to execution by the one or more processors, cause the one or more processors to: receive an indication of each of multiple meetings scheduled for a future time; parse metadata associated with each of the multiple meetings; build a container for each of the multiple meetings based on the parsed metadata, each container comprising an isolated usage session; add the containers for the multiple meetings to a container store; and provide, to a host system, a container for a meeting of the multiple meetings.

Alternatively or in addition to any of the above described computing devices, any one or combination of: wherein to build the container for each of the multiple meetings is to obtain one or more layers from a layer repository based on the parsed metadata; wherein to build the container is to include one or more static layers into the container; wherein to build the container is to include one or more dynamic layers; wherein the multiple instructions further cause the one or more processors to receive an update for a meeting of the multiple meetings, parse the update to determine new metadata associated with the meeting, and update the container for the meeting in the container store; wherein to parse the metadata is to access data from user profiles associated with the meeting, data associated with the host system, and/or data contained in the indication.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method performed by one or more computer hosts, the method comprising:
   receiving an indication of a meeting in a meeting scheduling system executing on the one or more hosts, the meeting scheduled by the meeting scheduling system to occur at a future time associated with the meeting, the indication comprising a document associated with the meeting and comprising content related to the meeting;
   automatically creating a container for the meeting, the container comprising an isolated usage session comprising a process container or virtualized machine, the creating including configuring the container to contain both a program and the document, the program configured to operate on the document, the document provided for incorporation into the container in association with the indication of the meeting, wherein the process container is configured to be executed by a host operating system and is implemented with namespace isolation to provide the program therein with a composed view of shared and isolated parts of the host operating system, and wherein the virtual machine is configured to be executed by the host operating system and comprises virtual devices and a guest operating system configured to execute the program therein;

adding the container to a container store; and providing the container from the container store to a host responsive to receiving an indication to begin the meeting, the host comprising a virtualization component configured to execute the container and virtualize access of the program, when executing in the container, to resources of the host.

2. The method of claim 1, further comprising:
determining the indication of the meeting is associated with metadata;
parsing the metadata; and
customizing the container based on the parsed metadata.

3. The method of claim 1, further comprising customizing the container based on metadata associated with indicia of one or more people associated with the meeting, the customizing comprising applying display settings to the container or activating accessibility settings for the container.

4. The method of claim 1, further comprising customizing the container based on the document, the customizing comprising including acquiring a license for the program.

5. The method of claim 1, further comprising customizing the container based on the host, the customizing comprising applying to the container a theme determined by the host, applying display settings to the container, or including an application in the container.

6. The method of claim 1, wherein the indication of the meeting comprises a meeting invitation sent via a calendaring program.

7. The method of claim 1, further comprising:
receiving an indication of a change associated with the meeting; and
updating the container in the container store based on the indication of the change.

8. The method of claim 1, further comprising:
receiving an indication of at least one additional meeting;
building an additional container for the at least one additional meeting; and
adding the additional container to the container store.

9. One or more computer-readable storage media having stored thereon multiple instructions that, when executed by one or more processors of a computing device, cause the one or more processors to:
receive an indication of usage sessions scheduled, and future times respectively associated with the usage sessions;
build a container for each of the respective usage sessions, each container comprising a process container or a virtualized container and containing data relevant to the corresponding usage session, the data including a document associated with the corresponding usage session and an application configured to operate on the document;
add each of the containers to a container store;

retrieve a container for a specific meeting scheduled by a meeting scheduling system; and provide the container for the specific meeting to a host system comprising a host operating system on the basis of the host system participating in the specific meeting, the host system executing the container for the specific meeting by providing namespace isolation for the container to access a file system of the host operating system and by virtualizing access to memory and a processor of the host system.

10. One or more computer-readable storage media as recited in claim 9 wherein the containers built for each of the usage sessions are the same.

11. One or more computer-readable storage media as recited in claim 9, wherein some of the containers are customized for a same usage session.

12. One or more computer-readable storage media as recited in claim 11, wherein the custom built container is customized based on user data including accessibility settings, frequently used applications, or one or more learned preferences.

13. One or more computer-readable storage media as recited in claim 11, wherein the custom built container is customized based on characteristics of the host system, including characteristics determined by one or more sensors of the host system, a location of the host system in relation to one or more additional host systems, or one or more frequent settings.

14. One or more computer-readable storage media as recited in claim 11, wherein the custom built container is customized based on data associated with the specific usage sessions, the data including one or more documents associated with the usage session or one or more user profiles associated with the usage session.

15. A computing device comprising:
one or more processors; and
computer-readable storage medium having stored thereon multiple instructions that, responsive to execution by the one or more processors, cause the one or more processors to:
receive an indication of a meeting scheduled for a future time by a meeting scheduling system, the indication corresponding to a document associated with the meeting and comprising content related to the meeting;
parse metadata associated with the meeting;
build a container for the meeting by, based on the parsed metadata, including in the container the document and a program configured to operate on the document, the container comprising an isolated usage session configured for the corresponding meeting, the container comprising a process container within which the program can execute;
add the container for the meeting to a container store; and
provide, to a host system, the container for the meeting, the host system comprising a host operating system, the host system executing the container for the meeting by providing namespace isolation for the container to access a file system of the host operating system and by virtualizing access to memory and a processor of the host system, wherein the program operates on the document in the container while executing within the container.

16. A computing device as recited in claim 15, wherein the instructions further cause the one or more processors to build the container by selecting for addition thereto one or more layers from a layer repository, wherein the selecting is based on the parsed metadata.

17. A computing device as recited in claim 15, wherein the instructions further cause the one or more processors to build one or more static layers into the container.

18. A computing device as recited in claim 15, wherein the instructions further cause the one or more processors to build the container to include one or more dynamic layers.

19. A computing device as recited in claim 15, wherein the multiple instructions further cause the one or more processors to:
- receive an update for the meeting;
- parse the update to determine new metadata associated with the meeting; and
- update the container for the meeting in the container store.

20. A computing device as recited in claim 15, wherein the metadata is obtained from user profiles associated with the meeting, data associated with the host system, and/or data contained in the indication.

* * * * *